United States Patent [19]

Smith et al.

[11] Patent Number: 6,141,950
[45] Date of Patent: Nov. 7, 2000

[54] INTEGRATED AIR SEPARATION AND COMBUSTION TURBINE PROCESS WITH STEAM GENERATION BY INDIRECT HEAT EXCHANGE WITH NITROGEN

[75] Inventors: Arthur Ramsden Smith, Telford; Donald Winston Woodward, New Tripoli, both of Pa.

[73] Assignee: Air Products and Chemicals, Inc., Allentown, Pa.

[21] Appl. No.: 08/996,556

[22] Filed: Dec. 23, 1997

[51] Int. Cl.[7] .................................................. F02C 3/28
[52] U.S. Cl. .................... 60/39.02; 60/39.07; 60/39.182; 60/39.55
[58] Field of Search ................................ 60/39.02, 39.05, 60/39.07, 39.53, 39.55, 39.182, 39.181; 122/7 R, 7 B, 1 R

[56] References Cited

U.S. PATENT DOCUMENTS

| | | | |
|---|---|---|---|
| 3,731,495 | 5/1973 | Coveney | 62/39 |
| 4,019,314 | 4/1977 | Springman | 60/39.02 |
| 4,224,045 | 9/1980 | Olszweski et al. | 60/39.55 |
| 4,250,704 | 2/1981 | Bruckner | 60/39.12 |
| 4,631,915 | 12/1986 | Frewer et al. | 60/39.182 |
| 4,697,415 | 10/1987 | Schiffers | 60/39.12 |
| 4,707,994 | 11/1987 | Shenoy et al. | 62/11 |
| 4,729,217 | 3/1988 | Kehlhofer | 60/39.02 |
| 5,081,845 | 1/1992 | Allam et al. | 62/24 |
| 5,133,180 | 7/1992 | Horner et al. | 60/39.53 |
| 5,170,622 | 12/1992 | Cheng | 60/39.55 |
| 5,341,646 | 8/1994 | Agrawal et al. | 62/25 |
| 5,388,395 | 2/1995 | Scharpf et al. | 60/39.02 |
| 5,404,708 | 4/1995 | Sigling et al. | 60/39.182 |
| 5,406,786 | 4/1995 | Scharpf et al. | 60/39.05 |
| 5,410,869 | 5/1995 | Muller | 60/39.02 |
| 5,516,359 | 5/1996 | Kang et al. | 60/39.02 |
| 5,657,624 | 8/1997 | Kang et al. | 60/39.02 |
| 5,666,823 | 9/1997 | Smith et al. | 62/646 |

FOREIGN PATENT DOCUMENTS

| | | |
|---|---|---|
| 0773416 | 5/1997 | European Pat. Off. . |
| 1455960 | 11/1976 | United Kingdom . |

*Primary Examiner*—Tae Kim
*Attorney, Agent, or Firm*—John M. Fernbacher

[57] ABSTRACT

Oxygen is produced in an integrated gas turbine-driven air separation process in which heat of compression is recovered from the compressed air feed for the air separation process by heat transfer with the waste nitrogen-rich stream from the air separation process, and the heated waste nitrogen-rich stream is utilized to generate steam. This steam is used to provide a portion of the work to drive the feed air compressor, either by introduction into the gas turbine combustor for expansion with combustion products in the gas turbine expander or by expansion in a separate steam turbine. The process is useful for oxygen production in remote locations where low-cost fuel is readily available and moderate energy efficiency is acceptable, but where capital equipment costs are high and operating complexity is undesirable.

19 Claims, 3 Drawing Sheets

INTEGRATED AIR SEPARATION AND COMBUSTION TURBINE PROCESS WITH STEAM GENERATION BY INDIRECT HEAT EXCHANGE WITH NITROGEN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to the production of oxygen by an integrated air separation/gas turbine process. In a gas turbine combined cycle power generation process, ambient air is adiabatically compressed and combusted with a fuel gas in a combustor. The combustion product is work expanded to slightly above atmospheric pressure, and the generated work is utilized to drive the compressor and usually an electric generator. The expander exhaust, which contains valuable high level heat, is introduced into a heat recovery steam generation (HRSG) system to recover high level heat as steam. The steam is expanded through a steam turbine which drives an additional electric generator.

A portion of the compressed air may be withdrawn from the gas turbine compressor for a variety of uses, including feed air (typically called "extracted air") to an air separation unit, as cooling for the turbine itself, or for other pressurized air requirements within the facility. The extracted air contains valuable heat that can be recovered at discrete temperature levels by vaporization and expansion of working fluids or by recovering sensible heat for transfer into another process fluid. An inert gas stream, such as steam or nitrogen, may be injected into the combustor for reduction of nitrogen oxides in the exhaust gas and for additional gas motive flow to the expander.

An air separation unit (ASU) for the production of oxygen may be integrated with a gas turbine combined cycle, and the oxygen used for example in a coal gasification system to provide fuel for the gas turbine combustor. A nitrogen-rich product, which is considered a waste stream if nitrogen is not required in the process, also is produced by the air separation system. Some or all of the ASU feed air typically is extracted from the gas turbine compressor at an elevated temperature. The expansion turbine exhaust can be introduced into an HRSG as described earlier for additional heat recovery via a steam turbine system for additional power generation.

The utilization of the nitrogen-rich waste stream is an important factor in the overall efficiency of integrated air separation/gas turbine systems, and several methods have been described in the prior art for such utilization. In one well-known and widely-used method, energy is recovered from the hot extracted air to provide cooled air for the ASU feed by cooling the extracted air against a compressed nitrogen-rich waste stream, which may be further heated by heat exchange with hot process streams. The resulting heated and compressed nitrogen-rich waste stream is injected into the gas turbine combustor, or alternatively into the gas turbine expander, to recover energy from the stream and thereby reduce the fuel required for combustion. In addition, the inert gas flow to the combustor reduces nitrogen oxide formation and increases the motive flow into and power output from the expansion turbine. This method of utilizing the nitrogenrich waste stream is described in representative U.S. Pat. Nos. 4,250,704, 4,697,415, 5,081,845, and 5,406,786 and in European Pat. Nos. Application EP 0 773 415 A2.

Another method of utilizing the nitrogen-rich waste stream in an integrated air separation/gas turbine system is described in U.S. Pat. Nos. 3,731,495, 4,019,314, and 5,406,786 wherein this stream is optionally heated and introduced directly into the gas turbine expander without prior compression.

Alternatively, the nitrogen-rich waste stream can be expanded in a separate expansion turbine which drives an electric generator or a process stream compressor as described in U.S. Pat. Nos. 4,019,314 and 5,410,869. The exhaust from this separate expansion turbine, if at a sufficiently high pressure, may be introduced into the gas turbine expander.

U.S. Pat. Nos. 5,388,395 describes an integrated air separation/gas turbine system in which the nitrogen-rich waste stream is cooled by work expansion to drive an electric generator, and the expanded cooled nitrogen stream is introduced into the gas turbine air compressor inlet to cool the total inlet stream. This improves the compressor efficiency and thus the overall gas turbine efficiency. Alternatively, if the nitrogen-rich waste stream is at a low pressure, the stream is chilled and humidified by direct contact with cold water and introduced into the gas turbine compressor.

An alternative use for the nitrogen-rich waste stream in an integrated air separation/gas turbine system is described in U.S. Pat. Nos. 4,729,217 wherein a portion of this stream is combined with fuel gas and fired in a waste heat recovery boiler with the gas turbine exhaust. Steam from the recovery boiler is expanded to generate electric power.

Great Britain Patent Specification 1 455 960 describes an air separation unit integrated with a steam generation system in which a nitrogen-rich waste stream is heated by indirect heat exchange with hot compressed air from the air separation unit main air compressor, the heated nitrogen-rich stream is further heated indirectly in a fired heater, and the final hot nitrogen-rich stream is work expanded in a dedicated nitrogen expansion turbine. The work generated by this expansion turbine drives the air separation unit main air compressor. The nitrogen expansion turbine exhaust and the combustion gases from the fired heater are introduced separately into a fired steam generator to raise steam, a portion of which may be expanded in a steam turbine to drive the air separation unit main air compressor. Cooled nitrogen is withdrawn from the steam generator and may be used elsewhere if desired. Optionally, the combustion gases from the fired heater are expanded in a turbine which drives a compressor to provide combustion air to a separate fired heater which heats the nitrogen-rich stream prior to expansion. In another option, the nitrogen expansion turbine exhaust and the combustion gases from the fired heater are combined and introduced into the economizer and air preheater sections of the fired steam generator.

Thus the prior art teaches a number of useful methods for the recovery of heat from extracted air in an integrated gas turbine/air separation system. The most efficient methods require additional equipment such as heat exchangers, steam generators, fired heaters, steam turbines, compressors, electric generators, and the like. A high-efficiency integrated gas turbine/air separation system which utilizes this additional equipment will have a higher capital cost and greater operating complexity than a simpler, less-efficient system.

In certain industrial applications of integrated gas turbine/ air separation systems, high efficiency may not be required, while low capital cost and minimum operating complexity may be important. One such application is the production of oxygen for the conversion of natural gas to liquid fuels in remote locations far from industrialized areas. In this application, low-cost fuel is readily available and moderate energy efficiency is acceptable, but capital equipment costs are high and operating complexity is undesirable. In addition, electric power usually is not available at such locations, and the export of electric power or steam outside of the integrated gas turbine/air separation system and associated process area generally is not feasible. A limited amount of electricity and steam can be generated for use within the integrated gas turbine/air separation system and associated process area.

The conversion of natural gas to liquid fuels in remote locations thus requires an integrated gas turbine/air separation system designed to achieve a balance among energy efficiency, capital cost, and process simplicity. The invention described in the specification below and defined by the claims which follow addresses the need for simple, low-capital, and reliable oxygen production by an integrated gas turbine/air separation system specifically designed for operation at remote locations.

BRIEF SUMMARY OF THE INVENTION

The invention is a method for the production of oxygen which comprises:

(a) compressing air in an air compressor to provide a first and a second hot pressurized air feed stream;

(b) combusting a fuel with the first hot pressurized air feed stream in a combustor, withdrawing therefrom a hot pressurized gas, expanding the hot pressurized gas in a gas turbine expander, and withdrawing therefrom a gas turbine expander exhaust gas, wherein work produced by the expansion turbine provides a portion of the work for compressing air in step (a);

(c) cooling the second hot pressurized air feed stream and separating the resulting cooled pressurized air feed stream into an oxygen-rich product gas and a nitrogen-rich product gas;

(d) heating at least a portion of the nitrogen-rich product gas of step (c) by indirect heat transfer with the second hot pressurized air feed stream to yield a hot nitrogen-rich stream and a cooled intermediate pressurized air stream;

(e) utilizing at least a portion of the hot nitrogen-rich stream to generate steam by indirect heat exchange with water, and expanding at least a portion of the resulting steam in an expansion turbine to provide another portion of the work for compressing air in step (a); and (f) utilizing at least a portion of the gas turbine expander exhaust gas to generate steam by indirect heat exchange with water, and expanding at least a portion of the resulting steam in an expansion turbine to provide a further portion of the work for compressing air in step (a).

The expansion turbine of step (e) and the expansion turbine of step (f) can be the same expansion turbine, or alternatively can be different expansion turbines.

The cooled pressurized air feed stream of step (c) preferably is further cooled, at least partially condensed, and separated by cryogenic distillation.

Optionally, the nitrogen-rich product gas can be reduced in pressure before heating in step (d). The nitrogen-rich product gas can be heated prior to pressure reduction by indirect heat transfer with the cooled intermediate pressurized air stream to yield a further cooled intermediate pressurized air stream which provides the cooled pressurized air feed stream of step (c). The pressure of the nitrogen-rich product gas can be reduced by work expansion and if the oxygen-rich product gas requires compression, the resulting expansion work can provide at least a portion of the compression work.

In one embodiment of the invention, steps (e) and (f) can be accomplished in common by combining at least a portion of the gas turbine expander exhaust gas and at least a portion of the hot nitrogen-rich stream, utilizing the resulting combined hot gas stream to generate steam by indirect heat exchange with water, and expanding the resulting steam in a common expansion turbine to provide work for compressing air in step (a). In this embodiment, the common expansion turbine is the gas turbine expander, and at least a portion of the resulting steam generated by the combined hot gas stream is expanded in the gas turbine expander with the hot pressurized gas from the combustor. Optionally, at least a portion of the resulting steam generated by the combined hot gas stream is introduced into the combustor in step (b).

In an alternative embodiment, the common expansion turbine is a steam turbine, and at least a portion of the resulting steam generated by the combined hot gas stream is expanded therein to provide work for compressing air in step (a). A portion of the resulting steam generated by the combined hot gas stream may be introduced into the combustor in step (b).

In another embodiment of the invention, the steam of step (e) and the steam of step (f) can be combined and at least a portion of the resulting combined steam expanded in a common expansion turbine. The common expansion turbine can be the gas turbine expander, and at least a portion of the combined steam is expanded in the gas turbine expander with the hot pressurized gas from the combustor to provide work for compressing air in step (a). Alternatively, the common expansion turbine is a steam turbine, and at least a portion of the combined steam is expanded therein to provide work for compressing air in step (a).

In a further embodiment, the expansion turbine in step (e) is a steam turbine and the expansion turbine in step (f) is the gas turbine expander. At least a portion of the resulting steam generated by the gas turbine expander exhaust gas is expanded in the gas turbine expander with the hot pressurized gas from the combustor. If desired, at least a portion of the resulting steam generated by the combined hot gas stream is introduced into the combustor in step (b). Alternatively, steam can be imported from an associated process area for use within the gas turbine/air separation system.

In contrast to the above embodiment, the expansion turbine in step (e) can be the gas turbine expander, and at least a portion of the resulting steam generated by the hot nitrogen-rich stream is expanded in the gas turbine expander with the hot pressurized gas from the combustor. At least a portion of the resulting steam generated by the hot nitrogen-rich stream can be introduced into the combustor in step (b). In this version of the invention, the expansion turbine in step (f) is a steam turbine and steam generated by the gas turbine expander exhaust gas is expanded therein.

If desired, additional steam can be imported and introduced into the expansion turbine of step (e) or the expansion turbine of step (f) to increase the work of expansion therein.

DETAILED DESCRIPTION OF THE INVENTION

The invention is a method of producing oxygen using an air separation system integrated with a gas turbine-driven air compression system which extracts additional heat from the gas turbine exhaust to reduce the overall energy requirements for oxygen production. The system operates on fuel as the primary energy source, and generally no electric power or steam is produced for export. Steam import may be used in certain situations. The system utilizes a minimum number of compressors, expanders, and heat exchangers, thereby reducing capital cost, maintenance, and operating complexity. The invention is particularly useful in remote locations where a fuel such as natural gas is plentiful, capital costs must be minimized, electric power is not readily available for import.

Figure 1:
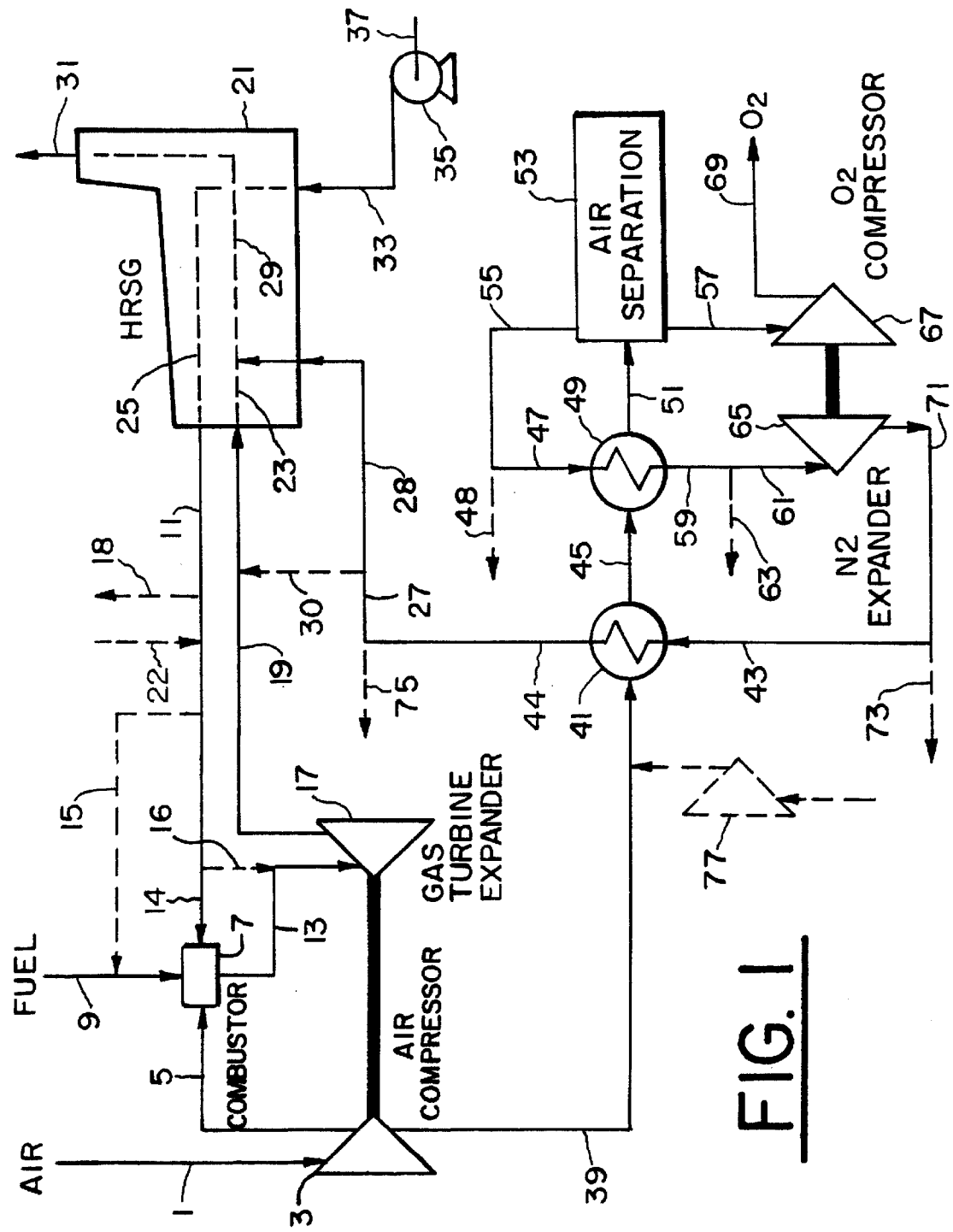
FIG. 1 is a schematic flow diagram of an embodiment of the present invention.

An embodiment of the invention is illustrated in FIG. 1. Air 1 is compressed in compressor 3, preferably an adiabatic compressor, to 48–590 psia and 300–1200° F. Two portions of compressed air are withdrawn from the compressor. Both portions can be withdrawn at the same pressure from the compressor discharge, or alternatively one portion can be withdrawn from an intermediate stage at a lower pressure and the other withdrawn from the compressor discharge. First compressed air stream 5 is combusted in gas turbine combustor 7 with fuel provided by line 9 to produce hot pressurized combustion gas stream 13. Steam in line 14, which is all or a portion of steam provided from line 11 (later defined) can be introduced into combustor 7 to moderate the combustion reactions. Typically the fuel in line 9 is natural gas. Optionally or alternatively, additional steam in line 15, which can be a portion of the steam in line 11, is combined with fuel in line 9. In another option, a portion 16 of steam from line 11 is combined with hot pressurized combustion gas stream 13. If desired, a portion of steam from line 11 can be used for blade cooling in gas turbine expander 17. Another portion 18 of steam in line 11 can be used elsewhere within the integrated gas turbine/air separation system if required. Alternatively, steam can be imported into the integrated gas turbine/air separation system from an associated process area through line 22. This would provide more steam for expansion in gas turbine expander 17 and would be a useful feature for optimizing the integrated gas turbine/air separation system.

Hot pressurized combustion gas stream 13, which optionally has been combined with steam from line 16, is expanded in gas turbine expander 17 to produce gas turbine exhaust stream 19 at near atmospheric pressure and 300 to 1600° F. Exhaust stream 19, which optionally may be combined with hot nitrogen-rich gas stream 30 (later defined) is introduced into heat recovery steam generator (HSRG) 21, and is cooled in representative heat transfer passage 23 by indirect heat transfer with boiling water and/or superheated steam in representative heat transfer passage 25.

Heat recovery steam generator 21 is of the type commonly used for gas turbine exhaust heat recovery in combined cycle power generation systems. A heat recovery steam generator comprises one or more tube circuits containing water, steam or mixtures of the two phases flowing in the inner or tube side of each circuit. The tube circuits are installed in a near-atmospheric pressure enclosure through which the hot exhaust gases from the gas turbine expander flow on the outer sides of the tubes. Water enters the inner side or tube side of a tube circuit at the cold end of the device and is progressively heated, vaporized, and optionally superheated by absorbing the heat contained in the gas turbine expander exhaust. Representative heat transfer passage 25 shown in FIG. 1 is a schematic representation of the inner side or tube side of a tube circuit. Representative heat transfer passages 23 and 29 shown in FIG. 1 are schematic representations of the outer side of a tube circuit. Cooled gas turbine exhaust is discharged in stack gas 31 to the atmosphere, while the generated steam flows to the gas turbine combustor or to a steam turbine. Different pressure levels of steam and different levels of superheat can be produced from the device to match the cooling curve of the exhaust gas stream.

Partially cooled gas turbine exhaust from representative heat transfer passage 23 may be combined with hot nitrogen-rich gas stream 28 (later defined) within heat recovery steam generator 21, preferably at a location where the temperatures of the gas turbine exhaust and the hot nitrogen-rich gas are equal or nearly equal. Alternatively, hot nitrogen-rich gas stream 30 (later defined) can be combined with gas turbine exhaust stream 19 prior to heat recovery steam generator 21 as shown, although a loss in heat recovery efficiency may result if the two streams are not equal or nearly equal in temperature. The combined stream of combustion products and nitrogen flows through representative heat transfer passage 29 in which it is further cooled by indirect heat transfer with vaporizing water and/or superheated steam in representative heat transfer passage 25. The completely vaporized water as saturated or superheated steam from representative heat transfer passage 25 provides the steam in line 11 which is used as earlier described. The resulting cooled mixed gas from representative heat transfer passage 29 is discharged to the atmosphere in stack gas 31. Pressurized boiler feed water 33 is provided by pump 35 from low pressure boiler feed water 37.

Second compressed air stream 39 from compressor 3 at 48 to 590 psia and 300–1200° F. is cooled in heat exchanger 41 against warm gas stream 43 (later defined) to a temperature approaching the temperature of compressed air stream 39. Since the flow of warm gas stream 43 usually will be less than the flow of the air stream entering heat exchanger 41, the pinch point or minimum temperature difference usually will be at the hot end of exchanger 41. An economic trade-off will determine the temperature level at which heat is recovered from air stream 39 and the amount of surface area required in heat exchanger 41 to transfer a given amount of heat.

Second compressed air stream 39 may be at the same pressure or a different pressure than compressed air stream 5. Intermediate cooled air stream 45 can be further cooled against gas stream 47 (later defined) in heat exchanger 49. Air stream 45 is cooled until the temperature of nitrogen-rich stream 59 is sufficient to generate a predetermined amount of work in nitrogen expander 65 or until an economic minimum temperature difference between streams 45 and 59 has been reached. Cooled pressurized air feed stream 51 then passes into air separation system 53, where it is separated into nitrogen-rich product stream 55 typically containing 80 to 99.999 mole % nitrogen and oxygen-rich product stream 57 typically containing 50 to 99.9 mole % oxygen. Nitrogen-rich product stream 55 preferably is at near ambient temperature and 15 to 590 psia, and oxygen-rich product stream 57 is at near ambient temperature and 15 to 1200 psia.

Air separation system 53 preferably is a cryogenic distillation system of any appropriate type known in the art, for example any of the systems described in U.S. Pat. Nos. 4,707,994, 5,081,845, 5,341,646, and 5,666,823 which are incorporated herein by reference. In this well-known method, cooled pressurized air feed stream 51 is further cooled, at least partially condensed, and distilled in one or more distillation columns. Refrigeration typically is provided by work expansion of one or more of the internal process streams. Preferably, air separation system 53 operates completely on cooled pressurized air feed stream 51, and preferably no external refrigeration or additional compression is required.

Alternatively, other types of air separation processes known in the art can be used, for example such as pressure swing adsorption and polymeric membrane permeation processes. These well-known methods operate on a pressurized air feed and utilize the differential between the air feed pressure and a lower pressure (typically near atmospheric pressure) to provide the driving force for separation. These processes typically operate at ambient or near-ambient temperatures, so that cooled pressurized air feed stream 51 would be at near-ambient temperature.

Nitrogen-rich product stream 55 provides gas stream 47 earlier described and optional nitrogen-rich product stream 48 which can be used for other applications. Nitrogen-rich gas stream 47 can be heated by indirect heat transfer against intermediate cooled air stream 45 in heat exchanger 49 to yield intermediate heated nitrogen-rich stream 59, which may be split into intermediate heated nitrogen-rich stream 61 and optional nitrogen-rich product stream 63. Nitrogen-rich stream 61 can be work-expanded in expander 65 to near atmospheric pressure to drive compressor 67 for compression of oxygen-rich product stream 57 to yield compressed oxygen-rich product 69. Typically compressed oxygen 69 is utilized in the present invention for the partial oxidation of natural gas to provide synthesis gas for producing liquid fuel products such as methanol or hydrocarbon liquids.

Expanded nitrogen-rich product stream 71, now at a temperature between near ambient temperature and 800° F. and a pressure less than about 22 psia, provides warm gas stream 43 and optional nitrogen-rich product stream 73. Nitrogen-rich product stream 43 can be further heated in heat exchanger 41 against second compressed air stream 39, wherein heated stream 44 approaches the temperature of stream 39, thereby providing hot nitrogen-rich gas stream 27 and optional nitrogen-rich stream 75. Hot nitrogen-rich gas stream 27 provides hot nitrogen-rich gas streams 28 and 30 earlier described. Intermediate cooled air stream 45 is withdrawn from heat exchanger 41.

Alternative heating and expansion steps for nitrogen-rich gas stream 47 can be carried out if desired. For example, heat exchanger 49 optionally is not used, in which case nitrogen-rich gas stream 47 is expanded directly in expander 65 and reduced-pressure nitrogen-rich product stream 43 is heated completely in heat exchanger 41. Alternatively, heat exchanger 41 is not used and expanded nitrogen-rich product stream 43 is combined directly with gas turbine exhaust stream 19 in heat recovery steam generator (HSRG) 21. In yet another alternative, the pressure of nitrogen-rich gas stream 47 can be sufficiently low that expander 65 is not required, in which case heat exchanger 41 may not be required.

Optional modes of this embodiment are possible. For example, some of the feed air to air separation unit 53 can be provided by supplemental feed air compressor 77 (shown as an adiabatic compressor) to supplement second compressed air stream 39. Alternatively, supplemental feed air compressor 77 can be an intercooled compressor, in which case the supplemental compressed air would be combined (not shown) with either of compressed air streams 45 or 51. A motor or electric generator may be used in combination with nitrogen expander 65 and oxygen compressor 67. If expander 65 is not required, oxygen compressor 67 may be driven by an electric motor or by gas turbine expander 17 as described below. If oxygen compressor 67 is not required, expander 65 can be used to drive an electric generator.

When air separation system 53 is a cryogenic distillation system, compressed feed air 51 typically is treated by thermal swing adsorption (TSA) to remove water, carbon dioxide, and other impurities before the feed air is cooled to cryogenic temperatures. In the well-known TSA method, alternating adsorber vessels are taken offstream for regeneration to remove adsorbed contaminants by heating the adsorber, purging with a dry purge gas, and then cooling the adsorber to operating temperature before placing the regenerated adsorber back onstream. In the present invention, the heating and purging of an adsorber vessel can be provided by at least in part by optional nitrogen-rich product stream 63, which has been heated to 180–600° F. in heat exchanger 49, and the cooling of the adsorber vessel can be provided by purging with optional nitrogen-rich product stream 48, which is at near ambient temperature. Alternatively, optional nitrogen product streams 73 and 75 can be used for the cooling and heating/purging steps respectively in the TSA cycle.

Alternatively, a pressure swing adsorption (PSA) process can be used to remove water, carbon dioxide, and other impurities from the feed air to a cryogenic air separation system. The PSA process does not require hot regeneration gas, but does require an ambient temperature purge gas, and this purge gas can be provided by nitrogen streams 48 or 73.

In this preferred embodiment of present invention, no motor-driven compressors, separate steam turbines, fired heaters, condensers, or electric generators are required. The operation of gas turbine expander 17 on combustion products or a mixture of combustion products and steam provides all necessary work of compression for the feed to air separation system 53. Work for oxygen-rich product compressor 67 can be provided by expansion of the nitrogen-rich product in line 61, since the nitrogen-rich product is needed at low pressure for combination with gas turbine exhaust stream 19. While the method of the present embodiment will be less efficient than the more complex methods of the prior art, it will be simpler to construct and operate, and will have a lower capital cost.

Figure 2:
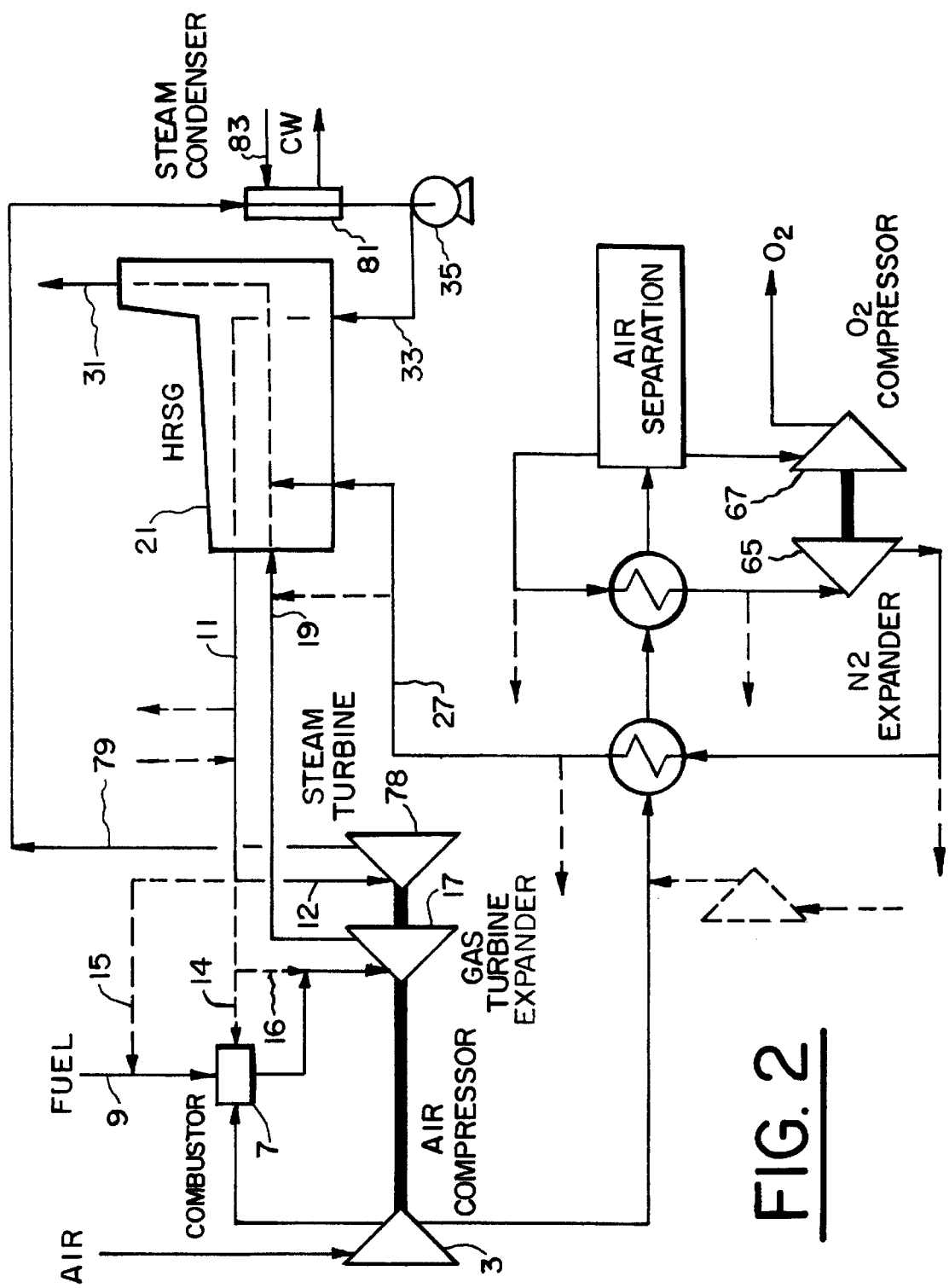
FIG. 2 is a schematic flow diagram of an alternative embodiment of the present invention.

An alternative embodiment of the invention is shown in FIG. 2 which utilizes a closed steam cycle suitable for locations in which water is scarce or where treatment of raw water for boiler feed water is expensive. Unlike the embodiment of FIG. 1, which uses steam on a once-through basis, the embodiment of FIG. 2 utilizes a separate steam turbine and condenses the steam turbine exhaust stream for reuse in heat recovery steam generator 21. Other elements of the process are the same as the embodiment of FIG. 1.

In FIG. 2, steam in line 12, which is a portion of the steam in line 11 from heat recovery steam generator 21, is expanded in steam turbine 78 which drives air compressor 3 with gas turbine expander 17 by utilizing a common drive system. Optionally, steam in line 14, which is a portion of the steam in line 11 from heat recovery steam generator 21, can be introduced into combustor 7 as described earlier with reference to FIG. 1. In another option, steam in line 15, which is a portion of the steam in line 11 from heat recovery steam generator 21, can be introduced into fuel stream 9 prior to combustor 7 as described earlier with reference to FIG. 1. It is also possible to introduce steam in line 16, which is a portion of the steam in line 11 from heat recovery steam generator 21, directly into gas turbine expander 17. Alternatively, steam can be imported into the integrated gas turbine/air separation system from an associated process area as described earlier with reference to FIG. 1. This would provide more steam for expansion in gas turbine expander 17 and/or steam turbine 78, thereby increasing expander work output.

Steam turbine expander exhaust in line 79 is condensed in condenser 81 and the condensate is returned as water feed 33 by pump 35. Makeup water is added to the condensate if required. Condenser 81 can be a water-cooled condenser as shown in which cooling water 83 may be supplied from a recirculating cooling tower or from natural surface waters. Optionally, a portion of steam from line 11 can be combined via line 15 with fuel in line 9 as earlier described, or introduced directly into combustor 7 in line 14 for the control of nitrogen oxides in stack gas 31. The steam circuit in this embodiment will be a partially open circuit if some steam is introduced into the gas turbine system via lines 12, 14, 15, or 16 as described above, and the water lost in stack gas 31 would be replaced by makeup water. The steam circuit in this embodiment will be a closed circuit if no steam is introduced into the gas turbine system via lines 12, 14, 15, or 16. In this closed circuit option, a mixed working fluid such as ammonia-water could be used instead of water alone. In all options of the embodiment of FIG. 2, however, gas turbine exhaust in line 19 will contain less water than the exhaust in the embodiment of FIG. 1, and may be at a higher temperature.

In the embodiments described above with reference to FIGS. 1 and 2, steam 11 is expanded in gas turbine expander 17 with hot pressurized combustion gas from combustor 7. This is accomplished by introducing some or all of steam 11 into one or more locations in the gas turbine system as follows: (1) combining some or all of the steam with fuel 9, and/or (2) introducing some or all of the steam into combustor 7, and/or (3) combining some or all of the steam with hot pressurized combustion gas stream 13. Thus a generic description stating that "steam is expanded in the gas turbine expander" means any or all of the options (1), (2), and (3) above.

Figure 3A:
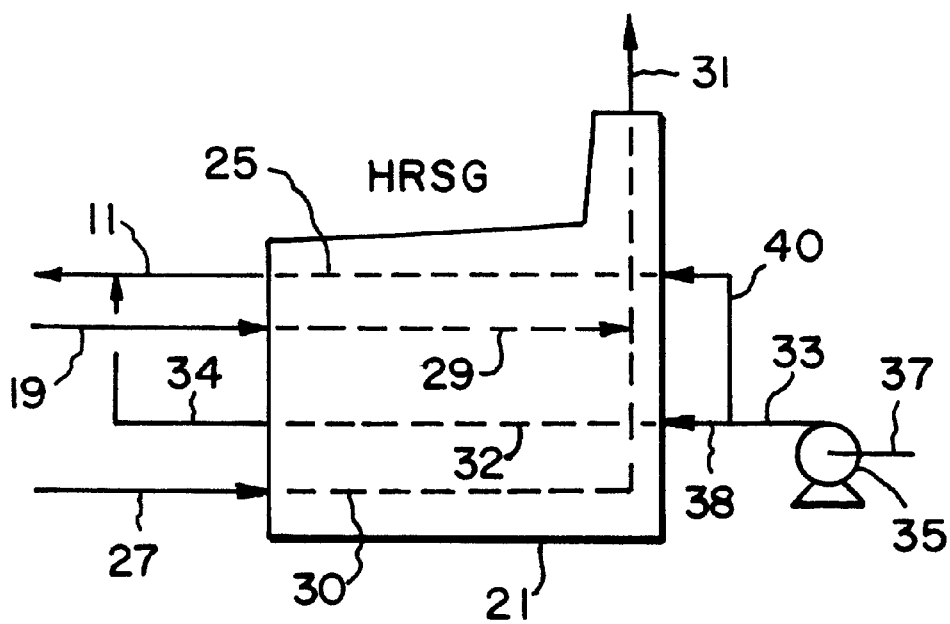
FIG. 3A is an alternative arrangement for the generation of steam in the process of the present invention.

The recovery of heat from heated nitrogen-rich product stream 27 can be carried out in alternative versions of heat recovery steam generator 21 as described in FIGS. 1 and 2. One alternative is shown in FIG. 3A wherein gas turbine exhaust stream 19 passes through heat recovery steam generator 21 in representative heat transfer passage 29 and generates steam by indirect heat transfer to representative heat transfer passage 25, while heated nitrogen-rich product stream 27 passes separately through representative heat transfer passage 30 and generates steam by indirect heat transfer to representative heat transfer passage 32. The resulting streams of steam in lines 11 and 34 are combined and introduced into the gas turbine system as earlier described. The resulting cooled gas turbine exhaust and nitrogen-rich product streams can be combined and discharged to the atmosphere in stack gas 31. Boiler feed water streams 38 and 40 are provided from boiler feed water stream 33 from pump 35 as earlier described.

Figure 3B:
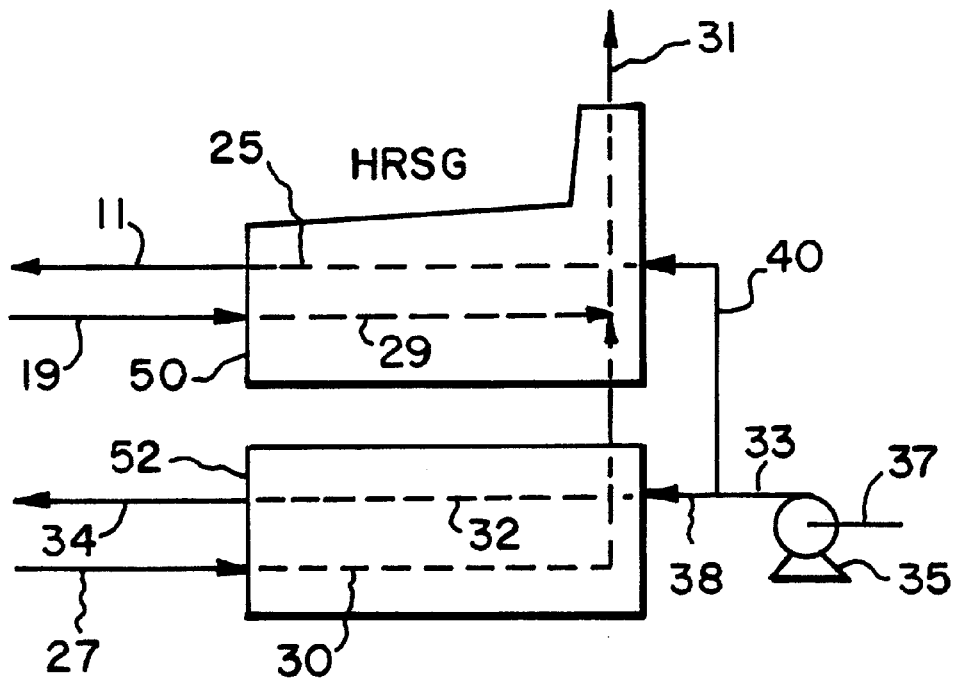
FIG. 3B is another alternative arrangement for the generation of steam in the process of the present invention.

An alternative method for the recovery of heat from heated nitrogen-rich product stream 27 is shown in FIG. 3B.

In this alternative, heat recovery steam generator 21 is segmented into sections 50 and 52 which are operated independently for heat transfer service, and cooled process gas streams are discharged in stack gas 31. In this alternative, gas turbine exhaust stream 19 passes through heat recovery steam generator section 50 in representative heat transfer passage 29 and generates steam by indirect heat transfer to representative heat transfer passage 25, while heated nitrogenrich product stream 27 passes separately through heat recovery steam generator section 52 in representative heat transfer passage 30 and generates steam by indirect heat transfer to representative heat transfer passage 32. The steam is withdrawn separately in lines 11 and 34, and each may be at a different pressure and temperature. At least a portion of the steam in line 34 can be introduced into gas turbine combustor 7 or turbine expander 17 as earlier described. The resulting cooled gas turbine exhaust and nitrogen-rich product streams are combined in stack gas 31. Boiler feed water streams 38 and 40 are provided from boiler feed water stream 33 from pump 35 as earlier described.

Since steam in lines 11 and 34 of FIG. 3B may be at different pressures and temperatures, one stream may be introduced into steam turbine 78 of FIG. 2 and the other introduced into the gas turbine system at one or more locations as described above. For example, steam in line 11 could be used as described in FIG. 1 while steam in line 34 could be expanded independently in steam turbine 78. Alternatively, steam in line 34 could be introduced at one or more locations in the gas turbine system as described in FIG. 1 while steam in line 11 could be expanded independently in steam turbine 78.

The embodiment of the present invention described above thus recovers the heat of compression from second compressed air stream 39 prior to air separation system 53 by heating nitrogen-rich product stream 55 and after optional pressure reduction combining the resulting heated nitrogen stream 27 directly with gas turbine exhaust 19 to generate steam in heat recovery steam generator 21. Alternatively, heated nitrogen stream 27 and gas turbine exhaust 19 are utilized separately to generate steam in heat recovery steam generator sections 50 and 52. The heat recovered from both heated nitrogen stream 27 and gas turbine exhaust 19 is recovered in the form of steam in line 11 (and optionally steam in lines 14, 15, or 16 if used) which is expanded with combustion products in gas turbine expander 17. This method of the present invention differs from earlier cited prior art in which a nitrogen-rich product stream is heated and/or compressed and then introduced into a gas turbine combustor or expander. In some of the prior art methods, steam is generated only from a gas turbine exhaust and the steam is expanded in a separate steam turbine to generate electric power or to drive the air compressor for the air separation system.

Thus in both embodiments of the invention as described above, heat is recovered from the compressed air feed for the air separation unit by indirect heat exchange with the waste nitrogen-rich stream from the air separation unit, and the heat thus recovered in the waste nitrogen-rich stream is utilized separately or in combination with the gas turbine exhaust to generate steam. This steam is used to provide a portion of the work to drive the feed air compressor, either by introduction into the gas turbine combustor or expansion turbine inlet for expansion with combustion products in the gas turbine expander (FIG. 1), or alternatively by expansion in a separate steam turbine (FIG. 2).

The recovery of the heat of compression from air separation unit compressed air feed as described above differs from prior art methods in the unique combination of (1) using the waste nitrogen-rich stream to transfer heat from air separation unit compressed feed air to a heat recovery steam generation step, (2) expanding pressurized combustion gases in a gas turbine to provide at least a portion of the work to drive the feed air compressor, and (3) expanding steam from the heat recovery steam generation step to provide the remaining portion of the work to drive the feed air compressor.

The compressed air feed stream for the air separation unit supplied by the gas turbine compressor has been characterized as a single stream in the embodiments described above. If desired, two or more compressed air feed streams could be supplied at different pressures and processed in one or more independent air separation units operating in parallel.

While the method of the present invention may be less efficient and require more energy than methods taught in the prior art, the equipment required for the invention will be less complex and less costly. In addition, the present process will be simpler to operate, and will not require imported electricity. These benefits are desirable when oxygen is required in remote locations, particularly for the conversion of remote natural gas into liquid fuels.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A method for the production of oxygen which comprises:
    (a) compressing air in an air compressor to provide a first and a second hot pressurized air feed stream;
    (b) combusting a fuel with the first hot pressurized air feed stream in a combustor, withdrawing therefrom a hot pressurized gas, and work expanding the hot pressurized gas to provide a portion of the work for compressing air in step (a) and yield a hot expanded exhaust gas;
    (c) cooling the second hot pressurized air feed stream and separating the resulting cooled pressurized air feed stream into an oxygen-rich product gas and a nitrogen-rich product gas;
    (d) work expanding at least a portion of the nitrogen-rich product gas of step (c) and heating the resulting expanded nitrogen-rich product gas by indirect heat transfer with the second hot pressurized air feed stream to yield a hot expanded nitrogen-rich product gas stream and a cooled intermediate pressurized air stream;
    (e) utilizing at least a portion of the hot expanded nitrogen-rich product gas stream to generate steam by indirect heat exchange with water, and work expanding at least a portion of the resulting steam to provide another portion of the work for compressing air in step (a); and
    (f) utilizing at least a portion of the hot expanded exhaust gas to generate steam by indirect heat exchange with water, and work expanding at least a portion of the resulting steam to provide a further portion of the work for compressing air in step (a).

2. The method of claim 1 wherein the cooled pressurized air feed stream of step (c) is further cooled, at least partially condensed, and separated by cryogenic distillation.

3. The method of claim 1 wherein the nitrogen-rich product gas is heated prior to work expansion by indirect heat transfer with the cooled intermediate pressurized air stream to yield a further cooled intermediate pressurized air stream which provides the cooled pressurized air feed stream of step (c).

4. The method of claim 1 wherein the oxygen-rich product gas is compressed and at least a portion of the work required to compress the oxygen-rich product gas is provided by the work expansion of the nitrogen-rich product gas.

5. The method of claim 1 wherein the work expanding of steps (e) and (f) is accomplished by combining at least a portion of the hot expanded exhaust gas and at least a portion of the hot expanded nitrogen-rich product gas stream, utilizing the resulting combined hot gas stream to generate steam by indirect heat exchange with water, and work expanding the resulting steam to provide work for compressing air in step (a).

6. The method of claim 5 wherein at least a portion of the resulting steam generated by the combined hot gas stream is work expanded in a gas turbine expander with the hot pressurized gas from the combustor to provide work for compressing air in step (a).

7. The method of claim 6 wherein at least a portion of the resulting steam generated by the combined hot gas stream is introduced into the combustor in step (b).

8. The method of claim 6 wherein at least a portion of the resulting steam generated by the combined hot gas stream is work expanded in a steam turbine to provide work for compressing air in step (a).

9. The method of claim 8 wherein a portion of the resulting steam generated by the combined hot gas stream is introduced into the combustor in step (b).

10. The method of claim 1 wherein the steam of step (e) and the steam of step (f) are combined and at least a portion of the resulting combined steam is work expanded to provide work for compressing air in step (a).

11. The method of claim 10 wherein at least a portion of the combined steam is work expanded in a gas turbine expander with the hot pressurized gas from the combustor to provide work for compressing air in step (a).

12. The method of claim 10 wherein at least a portion of the combined steam is expanded in a steam turbine to provide work for compressing air in step (a).

13. The method of claim 1 wherein the work expansion in step (e) is carried out in a steam turbine.

14. The method of claim 13 wherein the work expansion in step (f) is carried out in a gas turbine expander, and wherein at least a portion of the resulting steam generated by the hot expanded exhaust gas is expanded in the gas turbine expander with the hot pressurized gas from the combustor.

15. The method of claim 14 wherein at least a portion of the resulting steam generated by the combined hot gas stream is introduced into the combustor in step (b).

16. The method of claim 1 wherein the work expansion in step (e) is carried out in a gas turbine expander, and wherein at least a portion of the resulting steam generated by the hot expanded nitrogen-rich product gas stream is expanded in the gas turbine expander with the hot pressurized gas from the combustor.

17. The method of claim 16 wherein at least a portion of the resulting steam generated by the hot nitrogen-rich stream is introduced into the combustor in step (b).

18. The method of claim 16 wherein the work expansion in step (f) is carried out in a steam turbine.

19. The method of claim 1 where additional steam is imported and utilized in the work expansion of step (e) or the work expansion of step (f).

* * * * *